June 1, 1965 W. L. LANGEHENNIG 3,186,733
TRAILER STEERING CONTROL DEVICE
Filed April 10, 1963 2 Sheets-Sheet 1
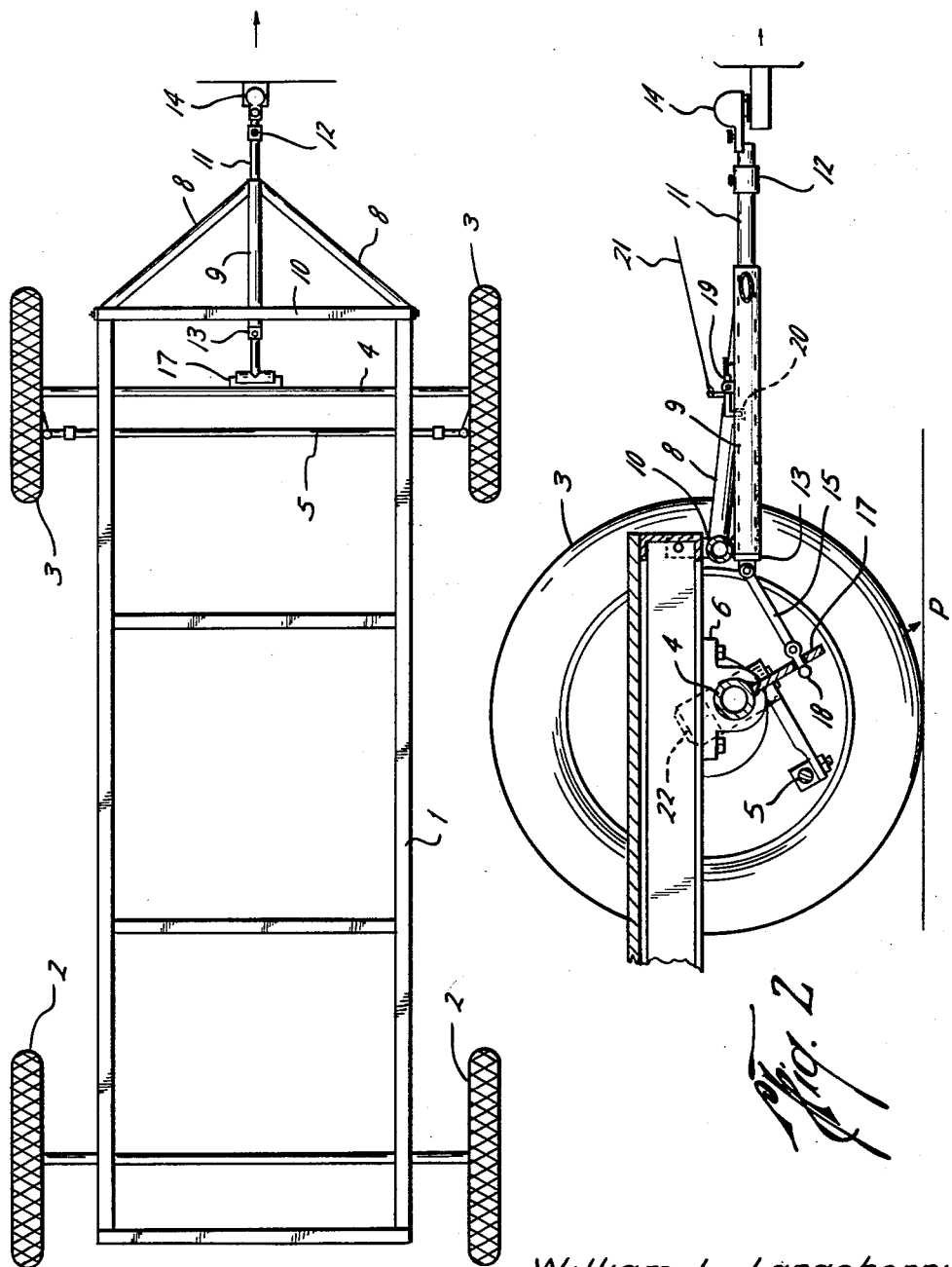
William L. Langehennig
INVENTOR.
BY Randulu O. Wyatt
ATTORNEY June 1, 1965 W. L. LANGEHENNIG 3,186,733
TRAILER STEERING CONTROL DEVICE
Filed April 10, 1963 2 Sheets-Sheet 2
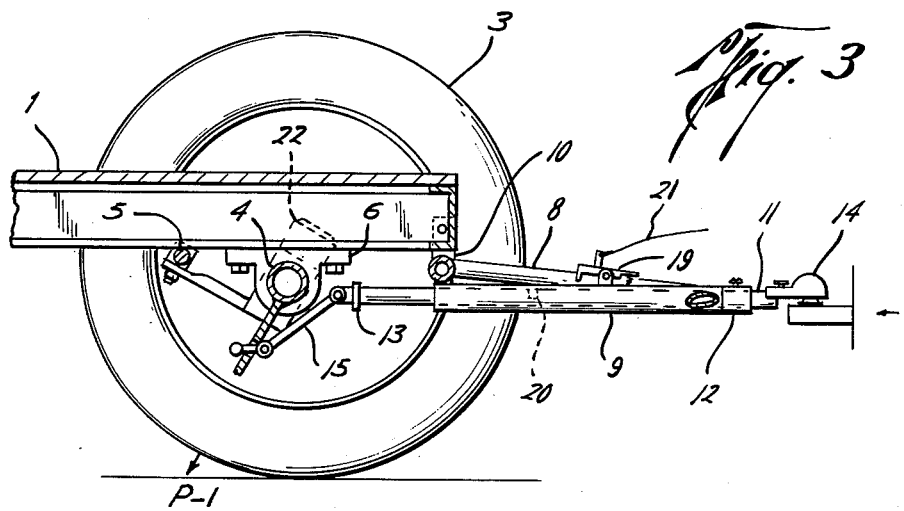
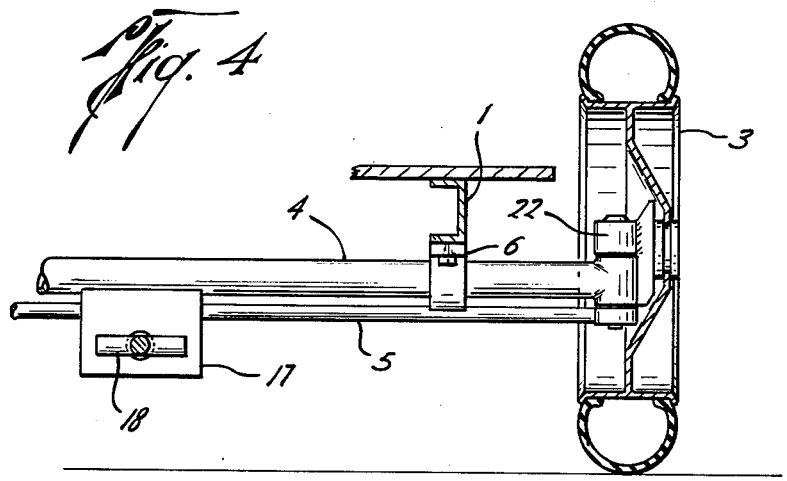
William L. Langehennig
INVENTOR.
BY *Ramsler O. Wyatt*
ATTORNEY though said connecting arm, pivotal lug and rotatable axle to position said king pins forwardly or rearwardly of the vertical axis of the ground surface.

4. A steering control for trailers as set forth in claim 3, with releasable locking means on said reciprocating shaft to hold said shaft against rearward movement and thereby hold said king pins in a position to place the pressure point forwardly of the vertical axis of the ground surface.

No references cited.

BROUGHTON G. DURHAM, *Primary Examiner.*

LEO FRIAGLIA, *Examiner.* or rearwardly of the axle, and means for locking said shaft against reciprocation.

4. In a means for controlling the direction of movement of a trailer having more than one pair of wheels, a rotating axle upon which the front wheels of the trailer are mounted, angularly mounted king pins pivotally anchoring said wheels to said axle with the pressure point on the wheels extending through the longitudinal axis of said king pins to a point forwardly or rearwardly of the axle depending upon the selected position of said king pins, a depending lug on said axle, said lug depending at an angle parallel with the axis of said king pins, a pair of tongue supports pivotally mounted on said framework and extending forwardly thereof, a housing mounted on said support, a reciprocating shaft in said housing, means adjacent each end of said shaft for limiting the movement of said shaft in said housing, a hitch means on one end of said shaft and a pivotal connecting arm on the other end of said shaft, said pivotal connecting arm being anchored to said depending lug to rotate said axle upon reciprocation of said shaft and to selectively move said king pins from one angular position with relation to the axle to another.

References Cited by the Examiner
UNITED STATES PATENTS

| 2,644,697 | 7/53 | Peterson | 280—80 |
| 2,674,463 | 4/54 | Peterson | 280—80 |
| 2,674,464 | 4/54 | Peterson | 280—80 |

PHILIP ARNOLD, *Primary Examiner.*

LEO FRIAGLIA, *Examiner.*